United States Patent
Lee et al.

(10) Patent No.: US 8,949,064 B2
(45) Date of Patent: Feb. 3, 2015

(54) MEASUREMENT METHOD AND MEASUREMENT SYSTEM USING THE SAME

(75) Inventors: Hyun-cheol Lee, Uiwang-si (KR);
In-kap Chang, Suwon-si (KR);
Seung-hoon Tong, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 653 days.

(21) Appl. No.: 13/182,909

(22) Filed: Jul. 14, 2011

(65) Prior Publication Data

US 2012/0101619 A1 Apr. 26, 2012

(30) Foreign Application Priority Data

Oct. 25, 2010 (KR) .................. 10-2010-0104245

(51) Int. Cl.
*G01D 1/00* (2006.01)
*G06Q 30/02* (2012.01)
*G06Q 10/00* (2012.01)

(52) U.S. Cl.
CPC ............ *G06Q 30/0278* (2013.01); *G06Q 10/20* (2013.01)
USPC ........................................ 702/127

(58) Field of Classification Search
USPC .......................................... 702/127; 700/108
See application file for complete search history.

(56) References Cited

U.S. PATENT DOCUMENTS

| | | | |
|---|---|---|---|
| 6,618,682 B2* | 9/2003 | Bulaga et al. ................. | 702/84 |
| 7,395,130 B2* | 7/2008 | Toyoshima et al. ........... | 700/108 |
| 2004/0210335 A1* | 10/2004 | Chandra et al. ............... | 700/109 |
| 2007/0203603 A1* | 8/2007 | Higashide et al. ............ | 700/108 |
| 2008/0091381 A1* | 4/2008 | Ogata et al. .................. | 702/155 |
| 2008/0286885 A1* | 11/2008 | Izikson et al. ................. | 438/7 |
| 2009/0119049 A1* | 5/2009 | Ayala et al. .................... | 702/83 |

FOREIGN PATENT DOCUMENTS

| | | |
|---|---|---|
| KR | 10-0306856 B1 | 10/2001 |
| KR | 10-0307413 B1 | 10/2001 |
| KR | 10-0414032 B1 | 1/2004 |
| KR | 2009-0095694 A | 9/2009 |

\* cited by examiner

*Primary Examiner* — John Breene
*Assistant Examiner* — Timothy H Hwang
(74) *Attorney, Agent, or Firm* — Harness, Dickey & Pierce, P.L.C.

(57) ABSTRACT

Example embodiments relate to a measurement method of measuring lots with improved process efficiency. The measurement method may include calculating a measurement capability (indicating a degree to which members to be measured may be processed per unit time in a measurement device); allocating the measurement capability according to a processing device and a processing condition; and calculating a measurement ratio of the lots processed by the processing device and the processing condition.

16 Claims, 11 Drawing Sheets

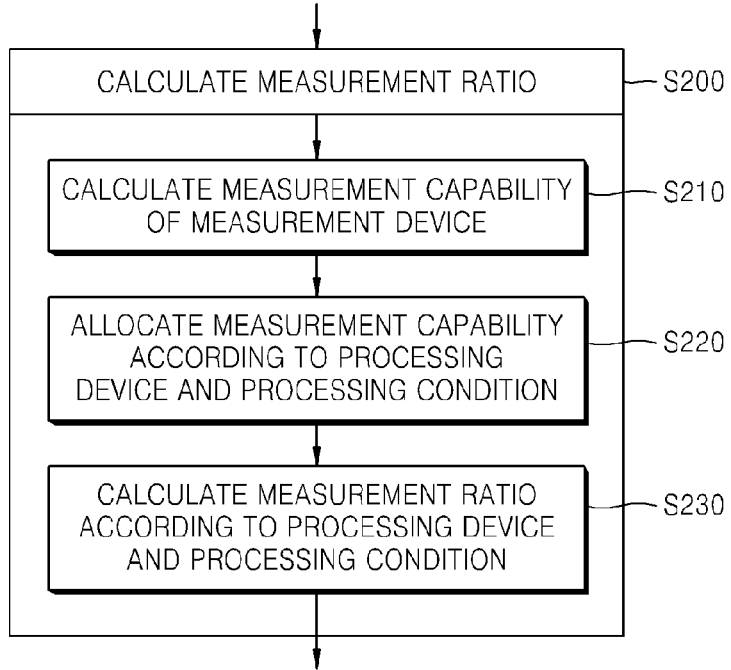
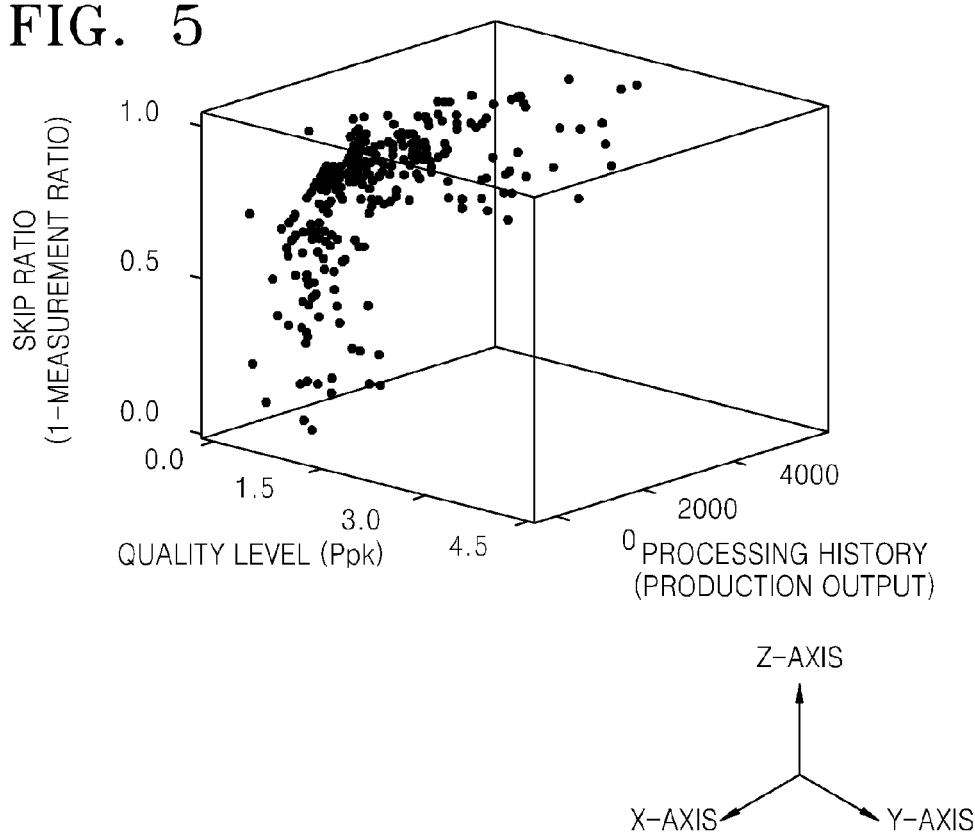

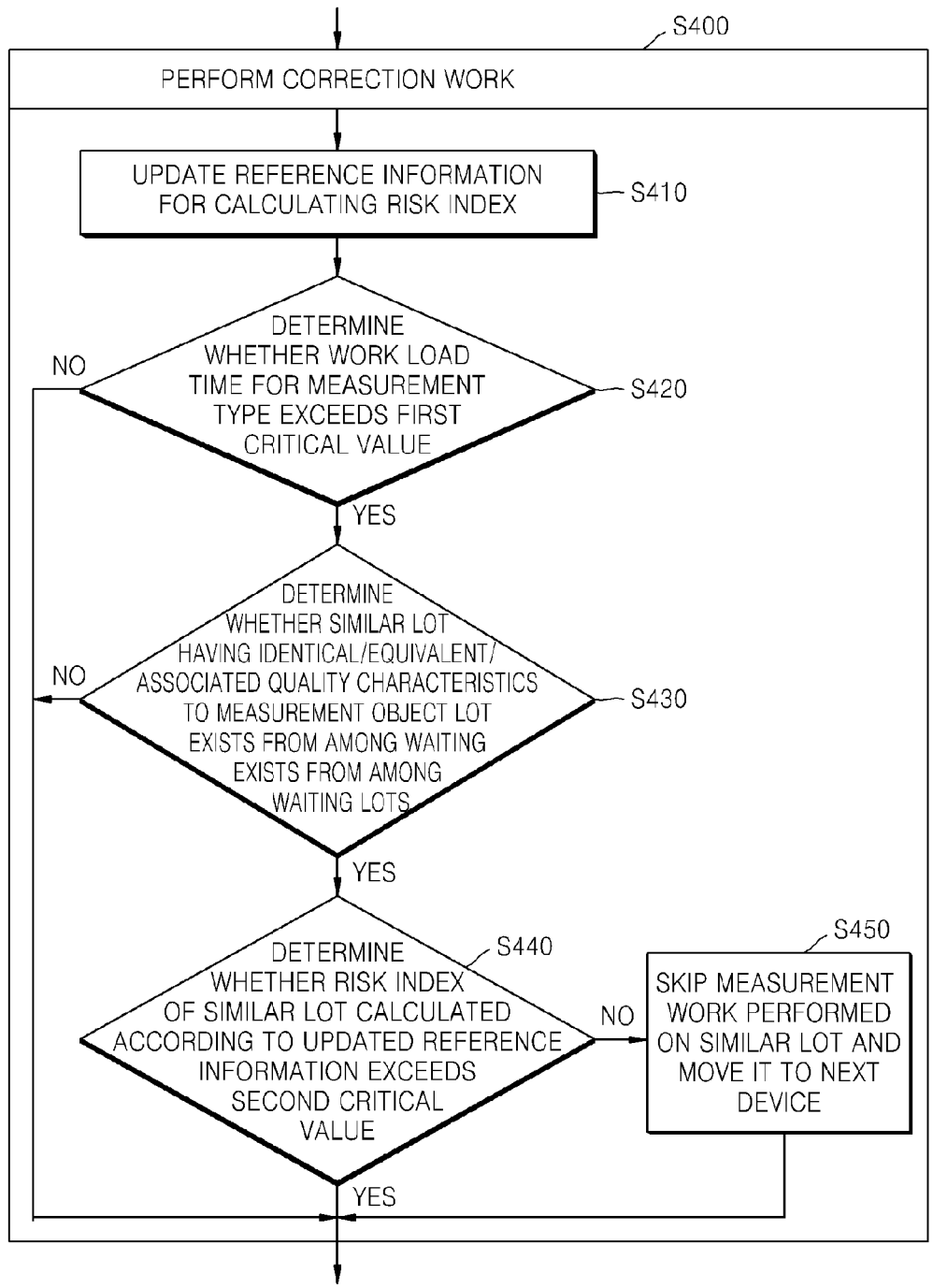

MEASUREMENT METHOD AND MEASUREMENT SYSTEM USING THE SAME

CROSS-REFERENCE TO RELATED APPLICATION

This application claims priority under 35 U.S.C. §119 to Korean Patent Application No. 10-2010-0104245, filed on Oct. 25, 2010 in the Korean Intellectual Property Office, the disclosure of which is incorporated herein in its entirety by reference.

BACKGROUND

The inventive concepts relate to a measurement method and a measurement system, and more particularly, to a measurement method with improved process efficiency and a measurement system using the measurement method.

In order to judge the quality of products or intermediate products, a measurement work should be performed on the products or intermediate products. A total inspection is an ideal measurement method in terms of quality but is inappropriate in terms of cost and time. Accordingly, there is performed a sampling inspection which presumes whether all samples are defective by performing a measurement on an arbitrary number of samples from among all the samples based on a statistical theory and determining whether the arbitrary number of samples are defective.

SUMMARY

The inventive concepts relate to a measurement method with improved process efficiency and a measurement system using the measurement method.

A measurement method of measuring lots processed according to a processing device and a processing condition according to an aspect of the inventive concepts may include calculating a measurement capability indicating a degree to which members to be measured may be processed per unit time in a measurement device; allocating the measurement capability according to the processing device and the processing condition; and calculating a measurement ratio of the lots processed by the processing device and the processing condition.

The allocating of the measurement capability may include allocating the measurement capability such that the measurement capability is proportional to an error ratio of lots processed according to the processing device and the processing condition.

The error ratio may be a type II error which occurs when lots which should be determined to be inappropriate are mistakenly determined to be appropriate.

The allocating of the measurement capability may include allocating the measurement capability such that the measurement capability is proportional to a processing scheduled quantity of lots to be processed according to the processing device and the processing condition.

The processing scheduled quantity of the lots to be processed according to the processing device and the processing condition may be a value obtained by multiplying a previous processing ratio of lots processed according to the processing device and the processing condition by a processing scheduled quantity of lots according to respective processing conditions, wherein the previous processing ratio is a ratio of a processing quantity of the processing device under the processing condition to processing quantities of a plurality of processing devices under the processing condition.

The measurement ratio may be a value obtained by dividing the measurement capability allocated according to the processing device and the processing condition by a processing scheduled quantity of lots to be processed according to the processing device and the processing condition.

The calculating of the measurement capability may include calculating the measurement capability such that the measurement capability is inversely proportional to a measurement time required to measure lots according to requested measurement conditions.

The measurement time may be an average value obtained by averaging measurement times of the measurement conditions. Alternatively, the measurement time may be a weighted average value obtained by adding a greater weight to a measurement time with a larger measurement history of a measurement condition from among the measurement times and averaging measurement times of the measurement conditions.

The measurement method may further include, according to the measurement ratio, defining some lots processed in the processing device as measurement object lots and moving the measurement object lots to the measurement device, and moving some of remaining lots to a next processing device; and performing a measurement work on the measurement object lots in the measurement device.

The performing of the measurement work may include, when a work load time required to measure all waiting lots waiting in line at the measurement device exceeds a first critical value and a risk index of a foremost measurement object lot does not exceed a second critical value, skipping the measurement work performed on the foremost measurement object lot and moving the foremost measurement object lot to the next processing device, wherein the risk index is a value indicating a degree to which a problem may occur when the measurement work performed on the measurement object lots is skipped.

After the performing of the measurement work, the measurement method may further include when a work load time required to measure all waiting lots waiting in line at the measurement device exceeds a first critical value and a risk index of a similar lot having identical, equivalent, or associated quality characteristics to a foremost measurement object lot from among the waiting lots does not exceed a second critical value, skipping a measurement work performed on the similar lot and moving the similar lot to the next processing device, wherein the risk index is a value indicating a degree to which a problem may occur when the measurement work performed on the similar lot is skipped.

The similar lot may be a lot processed in the same processing device and the same processing condition as the processing device and the processing condition in which the foremost measurement object lot is processed.

The risk index may be proportional to the number of total lots processed by the processing device, from a recently measured lot to a currently processed lot. The risk index may be proportional to the number of total lots processed by the processing device, from a recently measured lot to a current measurement object lot. The risk index may be proportional to the number of inappropriate determination occurrences in the processing device. The risk index may be inversely proportional to a measurement cycle of the processing device.

The measurement cycle may be inversely proportional to the measurement ratio.

A measurement method of lots processed according to a processing device and a processing condition according to another aspect of the inventive concepts may include calculating a measurement capability indicating a degree to which members to be processed may be processed per unit time in a measurement device; allocating the measurement capability according to the processing device and the processing condition such that the measurement capability is proportional to at least one of a defective ratio of the lots and a previous processing ratio; and calculating a measurement ratio of the lots, wherein the measurement ratio is proportional to the measurement capability allocated according to the processing device and the processing condition, and wherein the measurement ratio is inversely proportional to a processing scheduled quantity of lots according to the processing device and the processing condition.

According to another aspect of the inventive concepts, there is provided a measurement system for measuring lots processed according to a processing device and a processing condition, wherein the measurement system is configured to calculate a measurement capability indicating a degree to which members to be processed may be processed per unit time in a measurement device, allocate the measurement capability according to the processing device and the processing condition, and calculate a measurement ratio of the lots processed by the processing device and the processing condition.

A measurement method according to another aspect of the inventive concepts may include defining some lots processed in a processing device as measurement object lots and moving the measurement object lots to a measurement device, and moving some of remaining lots to a next processing device; and performing a measurement work on the measurement object lots in the measurement device, wherein the measurement device is configured to, when a work load time required to measure all waiting lots waiting in line at the measurement device exceeds a first critical value and a risk index of a foremost measurement object lot does not exceed a second critical value, skip the foremost measurement work on the measurement object lot and move the foremost measurement object lot to the next processing device.

According to another aspect of the inventive concepts, there is provided a measurement device for performing a measurement work on a measurement object lot, the measurement device configured to, when a work load time required to measure all waiting lots waiting in line at the measurement device exceeds a first critical value and a risk index of the measurement object lot does not exceed a second critical value, skip the measurement work performed on the measurement object lot and move the measurement object lot to a next processing device.

BRIEF DESCRIPTION OF THE DRAWINGS

Example embodiments of the inventive concepts will be more clearly understood when the following detailed description is taken in conjunction with the accompanying drawings in which:

FIG. 4 is a flowchart illustrating a measurement method according to a non-limiting embodiment of the inventive concepts;

FIGS. 5 through 8 are graphs illustrating a relationship between processing history information, quality level information, and a measurement ratio calculated by a measurement method according to a non-limiting embodiment of the inventive concepts;

FIG. 12 is a flowchart illustrating a measurement method according to another non-limiting embodiment of the inventive concepts.

DETAILED DESCRIPTION

Figure 1:
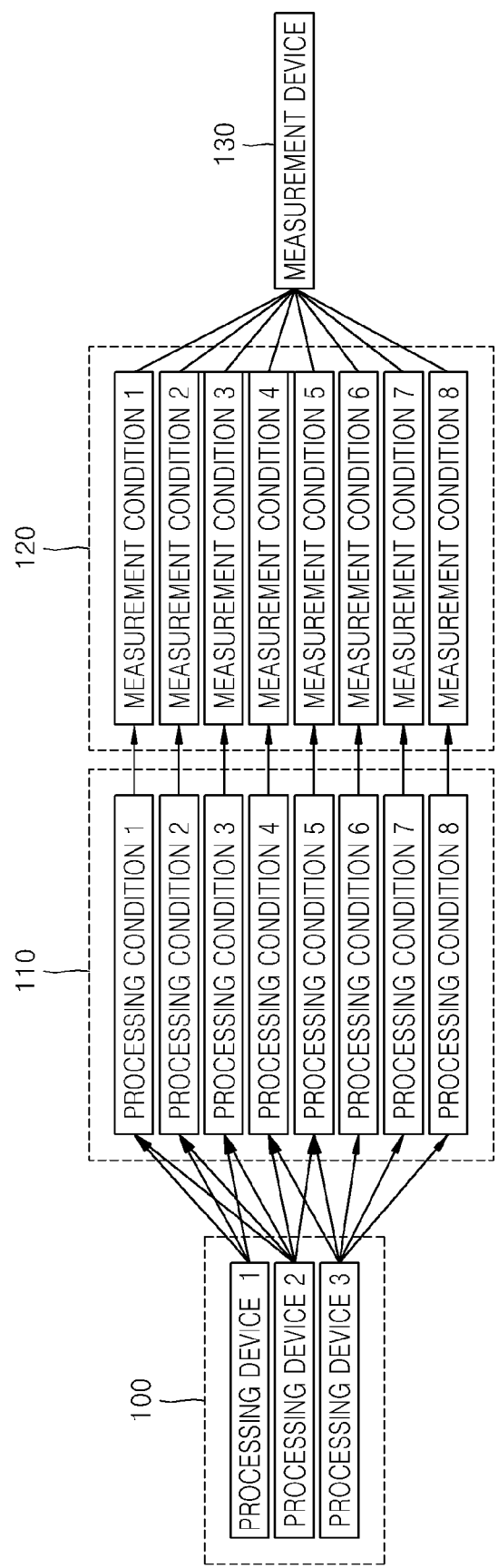
FIG. 1 is a block diagram illustrating a process in which lots processed according to processing devices and processing conditions are measured by a measurement device that stores individual measurement conditions.

Hereinafter, the inventive concepts will be described more fully with reference to the accompanying drawings, in which various example embodiments of the inventive concepts are shown.

The inventive concepts may, however, be embodied in many different forms and should not be construed as being limited to the embodiments set forth herein; rather these embodiments are merely provided so that this disclosure will be more thorough and complete so as to fully convey the scope of the inventive concepts to those skilled in the art.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "includes," "including," "comprises," and/or "comprising" used herein specify the presence of stated features, integers, steps, operations, members, components, and/or groups thereof, but do not preclude the presence or addition of one or more other features, integers, steps, operations, members, components, and/or groups thereof. As used herein, the term "and/or," includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Example embodiments are described herein with reference to cross-sectional illustrations that are schematic illustrations of example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but may be to include deviations in shapes that result, for example, from manufacturing.

Various example embodiments are discussed herein as being implemented in a suitable computing environment. Although not required, some example embodiments may be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware. For example, program modules and functional processes discussed herein may be implemented using existing hardware at existing network elements or control nodes. Such existing hardware may include one or more digital signal processors (DSPs), application-specific-integrated-circuits, field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

First, terms used in the specification will be defined with reference to FIG. 1. FIG. 1 illustrates a process in which lots processed according to processing devices 100 and processing conditions 110 are measured by a measurement device 130 that stores individual measurement conditions 120.

Referring to FIG. 1, the processing devices 100 may be defined as devices for processing lots to be processed. For example, the lots may be wafers including semiconductor substrates or bare chips which are separated from the wafers. If the lots are wafers, the processing devices 100 may be deposition devices or etching devices of the wafers. On the other hand, if the lots are bare chips, the processing devices 100 may be packaging devices or the like for packaging the bare chips. However, it should be understood that example embodiments are not limited to the above scenarios.

The processing devices 100 may process the lots according to the plurality of processing conditions 110 in various ways. The processing conditions 110 may include a common process and also an option requested by a customer or an option for meeting specifications according to a semiconductor agreement.

The measurement device 130 is configured to perform a measurement work on the processed lots. In this case, the lots processed by the processing devices 100 are members to be measured. For example, if the lots are wafers, the wafers processed by deposition devices or etching devices become members to be measured. If the lots are bare chips, packages processed by packaging devices or the like become members to be measured.

If members to be processed are wafers, the measurement device 130 may be a device for measuring critical dimensions (CD), thicknesses, defects, or particles of the wafers. If members to be measured are packages, the measurement device 130 may be a device for performing a burn-in test on the packages.

The measurement device 130 includes the plurality of individual measurement conditions 120, and the measurement conditions 120 may correspond to the processing conditions 110 in a one-to-one manner. The measurement device 130 measures elements (for example, CDs, thicknesses, defects, or particles) of members to be measured, such as wafers, for example, and determines whether the measured values satisfy the measurement conditions 120 corresponding in a one-to-one manner to the processing conditions 110.

Figure 2:
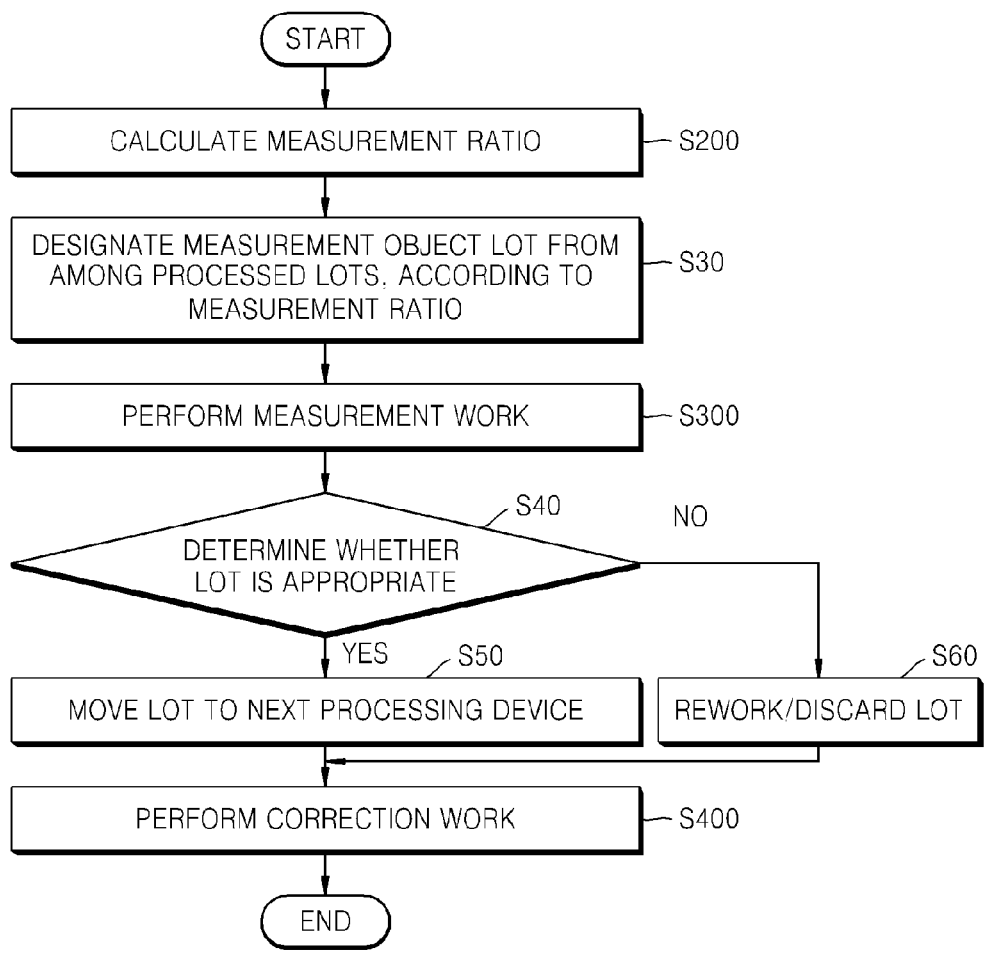
FIG. 2 is a flowchart illustrating a measurement method according to a non-limiting embodiment of the inventive concepts.

FIG. 2 is a flowchart illustrating a measurement method according to a non-limiting embodiment of the inventive concepts. Also, FIG. 3 is a schematic diagram illustrating the measurement device 130 according to a non-limiting embodiment of the inventive concepts.

Figure 3:
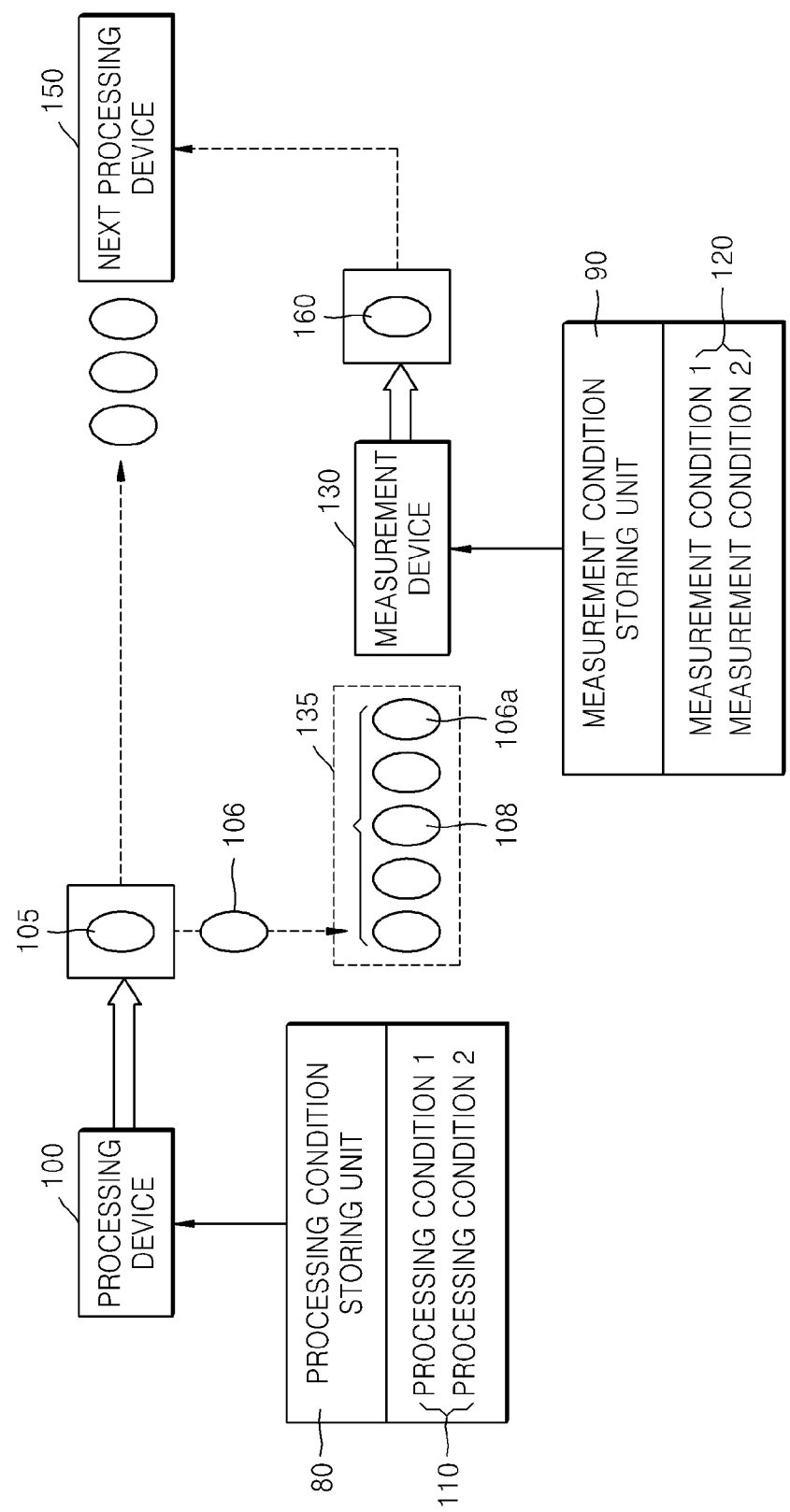
FIG. 3 is a schematic view illustrating a measurement device according to a non-limiting embodiment of the inventive concepts.

Referring to FIGS. 2 and 3, lots 105 processed in the processing devices 100 according to the processing conditions 110 stored in a processing condition storing unit 80 are moved to a next processing device 150 or the measurement device 130. In detail, according to a measurement ratio, some of the lots 105 processed in the processing devices 100 are designated as measurement object lots 106 and are moved to the measurement device 130, and the other remaining lots are moved to the next processing device 150. Here, the term measurement ratio refers to a ratio of lots designated as the measurement object lots 106 to the lots 105 processed (or to be processed) in the processing devices 100.

In a measurement method using a sampling method, a ratio of an arbitrary number of samples to total samples is generally determined to be a measurement ratio. However, in the inventive concepts, a measurement ratio is determined based on predetermined consideration factors such as processing history information and quality level information of the processing devices 100 and the processing conditions 110. Accordingly, the inventive concepts include operation S200 of calculating a measurement ratio before operation S30 of designating measurement object lots. The operation S200 of calculating the measurement ratio will be explained in detail with reference to FIG. 4.

The measurement object lots 106 are located in a waiting line 135 at the measurement device 130. Lots located in the waiting line 135 are referred to as waiting lots 108. The measurement device 130 may sequentially perform a measurement work beginning with a foremost measurement object lot 106a from among the waiting lots 108.

In operation S300, the measurement device 130 performs a measurement work on the foremost measurement object lot 106a from among the waiting lots 108 according to the measurement conditions 120 stored in a measurement condition storing unit 90. Selectively, in the performing of the measurement work on the foremost measurement object lot 106a, it may be determined whether the measurement work performed on the foremost measurement object lot 106a is skipped based on a predetermined algorithm, which will be explained in detail with reference to FIG. 9.

In operation S40, after comparison with the measurement conditions 120, the measurement device 130 determines whether the foremost measurement object lot 106a is appropriate. If it is determined in operation S40 by the measurement device 130 that the foremost measurement object lot 106a is appropriate, the method proceeds to operation S50. In operation S50, the lots 160 are moved to the next processing device 150. Otherwise, if it is determined in operation S40 by the measurement device 130 that the foremost measurement object lot 106a is inappropriate, the method proceeds to operation S60. In operation S60, the lots 160 are subjected to a rework in which a previous processing work is performed again, or are discarded.

Some of the lots 105 processed by the processing devices 100 and the processing conditions 110 may not satisfy the processing conditions 110. Such lots should be determined to be inappropriate during a measurement work, but may be mistakenly determined to be appropriate and may be moved to the next processing device 150. Such an error is defined as a type II error. Conversely, lots which are determined to be appropriate during a measurement work and should be moved to the next processing device 150 may be mistakenly determined to be inappropriate and subjected to a rework or discarded. Such an error is defined as a type I error.

In the type I error, since a work is performed again or lots are discarded, a risk of subsequent problems is low. However, in the type II error, since inappropriate lots are moved to the next processing device 150 and an additional processing work is performed, the type II error adversely affects subsequent processes, thereby reducing a process speed and increasing costs. In order to reduce the occurrence of such type II error, an effective sampling ratio (that is, a measurement ratio) should be determined in consideration of an error ratio of a process and the processing devices 100.

Selectively, after the measurement work is performed, in operation S400, the measurement device 130 may perform a correction operation. In operation S400, related information for calculating a risk index may be updated. Also, in operation S400, a measurement work performed on some of the waiting lots 108 waiting in the waiting line 135 may be skipped and the lots may be moved to the next processing device 150. In detail, based on a predetermined algorithm, it may be determined whether measurement works performed on lots having identical, equivalent, and/or associated quality characteristics to the foremost measurement object lot 106a can be skipped, which will be explained in detail with reference to FIG. 12.

FIG. 4 is a flowchart illustrating a measurement method according to a non-limiting embodiment of the inventive concepts. The measurement method includes a process of calculating a measurement ratio, which is used in the measurement method of FIG. 2, according to the processing devices 100 and the processing conditions 110. That is, the operation S200 of calculating the measurement ratio in the measurement method of FIG. 2 may be specifically illustrated in FIG. 4. A repeated explanation of previously-discussed aspects of the embodiments will be omitted for purposes of brevity.

Referring to FIGS. 3 and 4, the operation S200 of calculating the measurement ratio may include operation S210 of calculating a measurement capability of the measurement device 130, operation S220 of allocating the measurement capability according to the processing devices 100 and the processing conditions 110, and operation S230 of calculating a measurement ratio according to the processing devices 100 and the processing conditions 110.

In operation S210, first, a measurement capability of the measurement device 130 is calculated. The measurement capability, which is a degree to which members to be measured may be processed per unit time in the measurement device 130, may be represented as the number of lots on which a measurement work may be performed for one day. In order to calculate the measurement capability, a measurement time, measurement efficiency, a calculation unit time, and so on may be consideration factors.

First, the measurement time refers to a time required to perform a measurement work on members to be measured by using the measurement device 130 at a normal speed. In order to calculate the measurement time, an actual processing time (APT) indicating only a time required for an actual measurement or a standard time (ST) including the APT and a loading/unloading time may be considered.

Since the measurement time of the measurement device 130 is calculated, the measurement time may be calculated by averaging measurement times required by the measurement device 130 to perform measurements according to the measurement conditions 120. Selectively, the measurement time may be a weighted average measurement time by adding a greater weight to a measurement time with a larger measurement history from among the measurement conditions 120 of the measurement device 130 and averaging measurement times according to the measurement conditions 120.

For example, measurement times (for example, ST) according to the measurement conditions 120 of the measurement device 130 (for example, a thickness measurement device) illustrated in FIG. 1 may be shown as in Table 1.

TABLE 1

| Measurement condition | ST (minute) | Measurement history (number) | Measurement time 1 (average ST) | Measurement time 2 (volume weighted average ST) |
|---|---|---|---|---|
| Measurement condition 1 | 3 | 5 | 4.5 | 5.3 |
| Measurement condition 2 | 4 | 10 | | |
| Measurement condition 3 | 5 | 20 | | |
| Measurement condition 4 | 7 | 25 | | |
| Measurement condition 5 | 6 | 50 | | |
| Measurement condition 6 | 5 | 40 | | |
| Measurement condition 7 | 3 | 5 | | |
| Measurement condition 8 | 3 | 10 | | |

As described above, the measurement time may be 4.5 minutes obtained by averaging measurement times (ST) according to the measurement conditions 120, or may be 5.3 minutes obtained by weighted average of measurement times according to conditions after adding a greater weight to a measurement time having a larger measurement history.

Second, the measurement efficiency refers to a degree to which the measurement device 130 has productivity. In order to calculate the measurement efficiency, device total efficiency, performance efficiency, time availability, and so on may be considered. The time availability refers to a ratio of an actual operating time to a planned operating time. For example, if a planned operating time is 10 hours and an actual operating time is 8 hours, the time availability is 0.8. The performance efficiency may be defined as a ratio of an ST*production output during the actual operating time. The device total efficiency may be defined as a ratio of a ST*production output during the planned operating time.

Third, the calculation unit time refers to a unit time for which a measurement work is performed by the measurement device 130 on members to be measured. For example, when a calculation capability of the measurement device 130 is to be calculated weekly, the calculation unit time is 60 (minute/hour)*24 (hour/day)*7 (day)=1440 (minute).

The measurement capability of the measurement device 130 is calculated in consideration of the aforesaid factors (that is, measurement time, measurement efficiency, and calculation unit time). The measurement capability is calculated to be inversely proportional to a measurement time required to measure lots according to the requested measurement conditions 120. For example, a measurement capability of the measurement device 130 (for example, thickness measurement device) illustrated in Table 1 may be inversely proportional to an average ST or a volume weighted average ST. In detail, the measurement capability may be calculated by using the following equation.

$$\text{Measurement capability} = \frac{\text{Calculation unit time} \times \text{measurement efficiency}}{\text{Measurement time}} \quad \text{[Equation 1]}$$

Accordingly, a measurement capability when an average ST is used is 1440*0.8/4.5=1792 (number), and a measurement capability when a volume weighted average ST is used is 1440*0.8/5.3=1522 (number).

Although only a measurement capability of one measurement device 130 is calculated in the embodiment of FIG. 1, the inventive concepts are not limited thereto. The expression "calculate measurement capability" in S210 of FIG. 4 means calculate a measurement capability of a measurement device group, and lots processed according to the processing devices 100 and the processing conditions 110 may be measured by a plurality of measurement devices included in the same measurement device group. In this case, a measurement capability may be calculated by summing all individual measurement capabilities of the plurality of measurement devices.

Next, in operation S220, the measurement capability is allocated according to the processing devices 100 and the processing conditions 110. While a measurement is performed on an arbitrary number of samples from among all samples in an existing sampling inspection, since the measurement capability is allocated according to the processing devices 100 and the processing conditions 110 and a measurement ratio is accordingly calculated in the inventive concepts, sampling is performed according to the processing devices 100 and the processing conditions 110. That is, since a measurement ratio is calculated according to the processing devices 100 and the processing conditions 110, a more optimal sampling measurement may be performed in terms of time and cost.

The measurement ratio according to the processing devices 100 and the processing conditions 110 is determined by dividing the measurement capability according to the processing devices 100 and the processing conditions 110 by a processing scheduled quantity according to the processing devices 100 and the processing conditions 110 (refer to Equation 5).

In this case, how the measurement capability is allocated according to the processing devices 100 and the processing conditions 110 needs to be determined. In order to allocate the measurement capability, according to embodiments of the inventive concepts, the measurement capability may be allocated such that i) the measurement capability is proportional to an error ratio (that is, type II error) occurring when lots are measured according to the processing devices 100 and the processing conditions 110 and/or ii) the measurement capability is proportional to a processing scheduled quantity of lots to be processed according to the processing devices 100 and the processing conditions 110.

The reason why the measurement capability is allocated to be proportional to the error ratio is to reduce the aforesaid type II error. That is, since a greater measurement capability is allocated to the processing devices 100 and the processing conditions 110 having a higher error ratio, a probability that lots which should be determined to be inappropriate are mistakenly determined to be appropriate can be reduced.

Also, the reason why the measurement capability is allocated to be proportional to the processing scheduled quantity is to ensure a predetermined reliability level of sampling according to the processing devices 100 and the processing conditions 110. That is, since a predetermined reliability level can be ensured as long as the number of samples to be inspected increases as total samples increase, a greater measurement capability should be allocated as a processing scheduled quantity of lots to be processed according to a specific processing devices 100 and specific processing conditions 110 is increased.

First, the measurement capability may be allocated to be proportional to an error ratio. The error ratio has an inversely proportional relationship with a process capability, and corresponds in a one-to-one manner to the process capability. Here, the process capability refers to a short-term or long-term process capability (e.g., Pp and Ppk) calculated by a general statistical theory. The process capability is calculated by using a difference (range) between an upper specification limit (USL) and a lower specification limit (LSL) of resultant products, and in detail, may be calculated by dividing a customer's requirement level (USL-LSL) by a performance level ($6\sigma$).

For example, a process capability and an error ratio of the measurement device 130 (for example, thickness measurement device) illustrated in FIG. 1, and a result obtained by allocating a measurement capability to be proportional to the error ratio are shown as in Table 2.

TABLE 2

| Processing device | Processing condition | Process capability (error ratio) | Measurement capability allocated to be proportional to error ratio (number) |
|---|---|---|---|
| Processing device 1 | Processing condition 1 | 1.2 (0.9956) | 120 |
| | Processing condition 2 | 2.1 (0.7668) | 93 |
| | Processing condition 3 | 1.5 (0.9158) | 111 |
| Processing device 2 | Processing condition 1 | 0.75 (0.9856) | 119 |
| | Processing condition 2 | 1.3 (0.9445) | 114 |
| | Processing condition 3 | 1.0 (0.9724) | 117 |
| | Processing condition 4 | 1.3 (0.9445) | 114 |
| | Processing condition 5 | 0.9 (0.9786) | 118 |
| Processing device 3 | Processing condition 1 | 1.0 (0.9724) | 117 |
| | Processing condition 2 | 1.6 (0.8978) | 108 |
| | Processing condition 3 | 1.4 (0.9313) | 112 |
| | Processing condition 4 | 1.6 (0.8978) | 108 |
| | Processing condition 5 | 1.2 (0.9556) | 115 |
| | processing condition 6 | 0.9 (0.9768) | 118 |
| | Processing condition 7 | 1.5 (0.9158) | 111 |
| | Processing condition 8 | 2.0 (0.7986) | 96 |

That is, once a process capability and an error ratio according to the processing devices 100 and the processing conditions 110 are calculated based on the statistical theory, a measurement capability (i.e., calculated by Equation 1) may be allocated according to the processing devices 100 and the processing conditions 110 to be proportional to the error ratio. That is, a measurement capability calculated and allocated in a processing device i and a processing condition j may be calculated by using the following equation.

$$\text{Allocated measurement capability}(i, j) = \frac{\text{Error ratio}(i, j)}{\sum_j \sum_i \text{error ratio}(i, j)} \times \text{measurement capability} \quad \text{[Equation 2]}$$

For example, referring to Table 2 and Equation 2, a measurement capability (1, 1) allocated in a processing device 1 and a processing condition 1 may be calculated to be 0.99560/

(0.9956+0.7668+ . . . +0.9158+0.7986)*a measurement capability using an average ST (1792, refer to Equation 1 and the description thereof)=120. Besides, measurement capabilities in remaining processing devices 100 and remaining processing conditions 110 may be calculated by using Equation 2 and calculated results are shown in Table 2.

As such, since a larger measurement capability is allocated to a processing device and a processing condition having a higher error ratio, a type II error may be reduced and thus a probability that lots which should be determined to be inappropriate are mistakenly determined to be appropriate may be reduced.

Second, the measurement capability may be allocated to be proportional to a processing scheduled quantity. Since total samples are increased as a processing scheduled quantity of lots to be processed according to the processing devices 100 and the processing conditions 110 is increased, a larger measurement capability should be allocated in order to ensure a predetermined reliability level.

Accordingly, in order to allocate the measurement capability, a processing scheduled quantity is first calculated according to the processing devices 100 and the processing conditions 110. In order to calculate the processing scheduled quantity according to the processing devices 100 and the processing conditions 110, a previous processing ratio of lots processed according to the processing devices 100 and the processing conditions 110 and a processing scheduled quantity of lots according to the individual processing conditions 110 may be considered.

In detail, based on a processing scheduled quantity according to each processing condition 110, the processing scheduled quantity according to the processing devices 100 and processing conditions 110 can be calculated by separating the processing scheduled quantity according to the processing condition based on each processing device 100. In this case, in order to divide the processing scheduled quantity by each processing device 100, a previous processing ratio of lots processed according to the processing devices 100 and the processing conditions 110 may be considered. That is, a measurement capability allocated according to the processing devices 100 and the processing conditions 110 may be calculated by multiplying a previous processing ratio of lots processed according to the processing devices 100 and the processing conditions 110 by a processing scheduled quantity of lots according to the individual processing conditions 110, which is as shown in Equation 3.

Processing scheduled quantity$(i,j)$=processing scheduled quantity$(j)$×previous processing ratio$(i,j)$ [Equation 3]

For example, a processing scheduled quantity of each of the processing conditions 110 illustrated in FIG. 1 is as shown in Table 3.

TABLE 3

| Processing condition | Processing scheduled quantity (number) |
| --- | --- |
| Processing condition 1 | 500 |
| Processing condition 2 | 2000 |
| Processing condition 3 | 4000 |
| Processing condition 4 | 2000 |
| Processing condition 5 | 2000 |

TABLE 3-continued

| Processing condition | Processing scheduled quantity (number) |
| --- | --- |
| Processing condition 6 | 500 |
| Processing condition 7 | 1000 |
| Processing condition 8 | 3000 |

A processing history of the processing conditions 110 and the processing devices 100 illustrated in FIG. 1 may be shown as in Table 4, and a processing scheduled quantity calculated based on the processing history may be shown as in Table 4.

TABLE 4

| Processing device | Processing condition | Processing history (number) | Processing scheduled quantity (number) |
| --- | --- | --- | --- |
| Processing device 1 | Processing condition 1 | 200 | 143 |
|  | Processing condition 2 | 800 | 1143 |
|  | Processing condition 3 | 1000 | 2000 |
| Processing device 2 | Processing condition 1 | 100 | 71 |
|  | Processing condition 2 | 200 | 286 |
|  | Processing condition 3 | 200 | 400 |
|  | Processing condition 4 | 300 | 1500 |
|  | Processing condition 5 | 400 | 500 |
| Processing device 3 | Processing condition 1 | 400 | 286 |
|  | Processing condition 2 | 400 | 571 |
|  | Processing condition 3 | 800 | 1600 |
|  | Processing condition 4 | 1000 | 500 |
|  | Processing condition 5 | 1200 | 1500 |
|  | Processing condition 6 | 100 | 500 |
|  | Processing condition 7 | 300 | 1000 |
|  | Processing condition 8 | 200 | 3000 |

Referring to Table 3 and Table 4, in order to calculate a processing scheduled quantity of a processing device 1 and a processing condition 1, a previous processing ratio of the processing device 1 and the processing condition 1 is calculated. Since the previous processing ratio of the processing device 1 and the processing condition 1 is a ratio of a processing history (processing quantity) of the processing device 1 under the processing condition 1 to a processing history (that is, processing history) of the processing devices 100 under the processing condition 1, the previous processing ratio is 200/(200+100+400)=0.286, that is, 28.6%. Since a processing scheduled quantity of the processing condition 1 is 500 (number), a processing scheduled quantity of the processing device 1 and the processing condition 1 is 500*0.286=143 (number). Besides, measurement capabilities in remaining processing devices 100 and processing conditions 110 may be calculated by using Equation 3, and calculated results are shown as in Table 4.

As such, once a processing scheduled quantity is calculated, in a similar way to Equation 2, the measurement capability (i.e., calculated by Equation 1) may be allocated according to the processing devices 100 and the processing conditions 110 to be proportional to the processing scheduled quantity. That is, a measurement capability calculated and allocated in a processing device i and a processing condition j may be calculated by using the following equation.

$$\text{Allocated measurement capability}(i, j) = \\ \frac{\text{Processing scheduled quantity}(i, j)}{\sum_j \sum_i \text{processing scheduled quantity}(i, j)} \times \text{measurement capability} \quad \text{[Equation 4]}$$

For example, referring to Table 4 and Equation 4, a measurement capability (1, 1) allocated in a processing device 1 and a processing condition 1 may be calculated to be 143/(143+1143+ . . . +1000+3000)*a measurement capability using an average ST (1792, refer to Equation 1 and a description thereof)=17 (number). Besides, measurement capabilities in remaining processing devices 100 and processing conditions 110 may be calculated by using Equation 4, and calculated results are shown as in Table 5.

TABLE 5

| Processing device | Processing condition | Processing scheduled quantity (number) | Measurement capability allocated to be proportional to processing scheduled quantity (number) |
|---|---|---|---|
| Processing device 1 | Processing condition 1 | 143 | 17 |
| | Processing condition 2 | 1143 | 137 |
| | Processing condition 3 | 2000 | 239 |
| Processing device 2 | Processing condition 1 | 71 | 8 |
| | Processing condition 2 | 286 | 34 |
| | Processing condition 3 | 400 | 48 |
| | Processing condition 4 | 1500 | 179 |
| | Processing condition 5 | 500 | 60 |
| Processing device 3 | Processing condition 1 | 286 | 34 |
| | Processing condition 2 | 571 | 68 |
| | Processing condition 3 | 1600 | 191 |
| | Processing condition 4 | 500 | 60 |
| | Processing condition 5 | 1500 | 179 |
| | Processing condition 6 | 500 | 60 |
| | Processing condition 7 | 1000 | 119 |
| | Processing condition 8 | 3000 | 358 |

Once i) a measurement capability allocated to be proportional to an error ratio and ii) a measurement capability allocated to be proportional to a processing scheduled quantity are obtained by using the aforesaid algorithms and equations, a final measurement capability according to the processing devices 100 and the processing conditions 110 may be obtained as shown in Table 6 by averaging the measurement capabilities.

TABLE 6

| Processing device | Processing condition | Measurement capability allocated to be proportional to error ratio (number) | Measurement capability allocated to be proportional to processing scheduled quantity (number) | Measurement capability allocated according to processing device and processing condition (number) |
|---|---|---|---|---|
| Processing device 1 | Processing condition 1 | 120 | 17 | 69 |
| | Processing condition 2 | 93 | 137 | 115 |
| | Processing condition 3 | 111 | 239 | 175 |

TABLE 6-continued

| Processing device | Processing condition | Measurement capability allocated to be proportional to error ratio (number) | Measurement capability allocated to be proportional to processing scheduled quantity (number) | Measurement capability allocated according to processing device and processing condition (number) |
|---|---|---|---|---|
| Processing device 2 | Processing condition 1 | 119 | 8 | 64 |
| | Processing condition 2 | 114 | 34 | 74 |
| | Processing condition 3 | 117 | 48 | 83 |
| | Processing condition 4 | 114 | 179 | 147 |
| | Processing condition 5 | 118 | 60 | 89 |
| Processing device 3 | Processing condition 1 | 117 | 34 | 76 |
| | Processing condition 2 | 108 | 68 | 88 |
| | Processing condition 3 | 112 | 191 | 152 |
| | Processing condition 4 | 108 | 60 | 84 |
| | Processing condition 5 | 115 | 179 | 147 |
| | Processing condition 6 | 118 | 60 | 89 |
| | Processing condition 7 | 111 | 119 | 115 |
| | Processing condition 8 | 96 | 358 | 227 |

For example, since a measurement capability allocated based on an error ratio and a measurement capability allocated based on a processing scheduled quantity in a processing device 1 and a processing condition 1 are 120 and 17, respectively, a final measurement capability is (120+17)/2=69 (number).

Although a final measurement capability shown in Table 6 is obtained by adding the same weight to both measurement capabilities and averaging the measurement capabilities, the inventive concepts are not limited thereto. That is, for example, in order to emphasize a measurement capability allocated based on an error ratio in order to reduce a type II error, a final measurement capability may be calculated by adding a greater weight to the measurement capability allocated to be proportional to the error ratio. That is, for example, if two weights are added to a measurement capability allocated based on an error ratio, a final measurement capability in a processing device 1 and a processing condition 1 may be (120*2+17*1)/3=166 (number).

After the measurement capability is allocated according to the processing devices 100 and the processing conditions 110, the method proceeds to operation S230. In operation S230, a measurement ratio according to the processing devices 100 and the processing conditions 110 is calculated. Here, since the measurement ratio is a ratio of the measurement object lots 106 from among the lots to be processed according to the processing devices 100 and the processing conditions 110, a ratio of a final measurement capability to a processing scheduled quantity may be calculated as the measurement ratio, as shown in Equation 5.

$$\text{Measurement ratio}(i, j) = \frac{\text{Final measurement capability}(i, j)}{\text{Processing scheduled quantity}(i, j)} \quad \text{[Equation 5]}$$

For example, since a processing scheduled quantity of a processing device 1 and a processing condition 1 is 143, in reference to Table 4, and since a measurement capability of the processing device 1 and the processing condition 1 is 69, in reference to Table 6, a measurement ratio of the processing device 1 and the processing condition 1 is 69/143=0.48. Besides, other measurement ratios in processing devices 100 and processing conditions 110 may be calculated by using Equation 5, and calculated results are shown as in Table 7.

TABLE 7

| Processing device | Processing condition | Processing scheduled quantity (number) | Final measurement capability (number) | Measurement ratio |
|---|---|---|---|---|
| Processing device 1 | Processing condition 1 | 143 | 69 | 0.48 |
| | Processing condition 2 | 1143 | 115 | 0.10 |
| | Processing condition 3 | 2000 | 175 | 0.09 |
| Processing device 2 | Processing condition 1 | 71 | 64 | 0.90 |
| | Processing condition 2 | 286 | 74 | 0.26 |
| | Processing condition 3 | 400 | 83 | 0.21 |
| | Processing condition 4 | 1500 | 147 | 0.10 |
| | Processing condition 5 | 500 | 89 | 0.18 |
| Processing device 3 | Processing condition 1 | 286 | 76 | 0.27 |
| | Processing condition 2 | 571 | 88 | 0.15 |
| | Processing condition 3 | 1600 | 152 | 0.10 |
| | Processing condition 4 | 500 | 84 | 0.17 |
| | Processing condition 5 | 1500 | 147 | 0.10 |
| | Processing condition 6 | 500 | 89 | 0.18 |
| | Processing condition 7 | 1000 | 115 | 0.12 |
| | Processing condition 8 | 3000 | 227 | 0.08 |

As such, a measurement ratio may be determined by calculating a final measurement capability based on predetermined consideration factors such as processing history information and quality level information of the processing devices 100 and the processing conditions 110 and dividing the final measurement capability by a processing scheduled quantity according to the processing devices 100 and the processing conditions 110. Since an optimal measurement ratio is calculated in consideration of productivity elements and quality elements in this way, the measurement method of the inventive concepts may be better than an existing statistical measurement sampling method in terms of cost and time, and may improve process efficiency.

FIGS. 5 through 8 are graphs illustrating a relationship between processing history information, quality level information, and a measurement ratio calculated by a measurement method according to a non-limiting embodiment of the inventive concepts.

Referring to FIG. 5, the X-axis represents a processing history (for example, production output), the Y-axis represents a quality level (for example, Ppk), and the Z-axis represents a skip ratio (that is, 1-measurement ratio) of processed lots.

As shown from a relationship between the X-axis and the Z-axis, as the processing history (for example, production output) increases, the skip ratio increases and the measurement ratio decreases. This is because the measurement ratio is obtained by dividing a final measurement capability by a processing scheduled quantity according to a processing device and a processing condition, as shown in Equation 5.

Although in a process of calculating the final measurement capability of Equation 5, a measurement capability is allocated to be proportional to a processing scheduled quantity according to a processing device and a processing condition, this is to maintain a predetermined statistical reliability level, and an actual measurement ratio has an inversely proportional relationship with a processing scheduled quantity that is a denominator. Such a relationship means that since sampling having a predetermined reliability level is performed in more samples, the measurement ratio decreases accordingly and the skip ratio increases.

Figure 6:
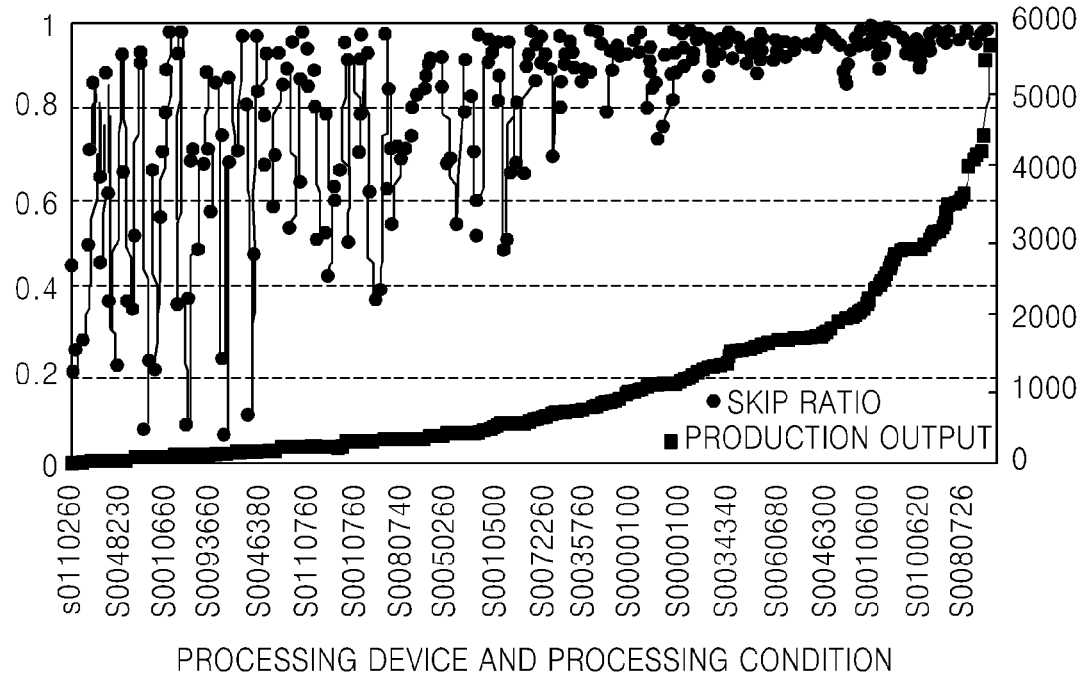

The relationship between the production output and the skip ratio (that is, 1-measurement ratio) is shown more clearly in FIG. 6. FIG. 6 shows a production output and a skip ratio according to a processing device and a processing condition, in which the skip ratio increases as the production output increases. That is, according to the measurement method of the inventive concepts, the skip ratio increases as the production output increases according to the processing device and the processing condition.

Also, as shown in a relationship between the Y-axis and the Z-axis of FIG. 5, as the quality level (for example, Ppk) increases, that is, as a defective ratio decreases, the skip ratio increases and the measurement ratio decreases. This is because the measurement ratio is proportional to a final measurement capability and the final measurement capability is proportional to the defective ratio, as shown in Equation 5.

As described above, in order to prevent lots which are inappropriate from being mistakenly determined to be appropriate and prevent a measurement performed on the lots from being skipped, a larger measurement ratio is given to lots produced in a processing device and a processing condition having a higher defective ratio. Since the quality level of FIG. 5 is inversely proportional to the defective ratio and the skip ratio is a value obtained by subtracting the measurement ratio from 1, the skip ratio increases as the quality level increases.

Figure 7:
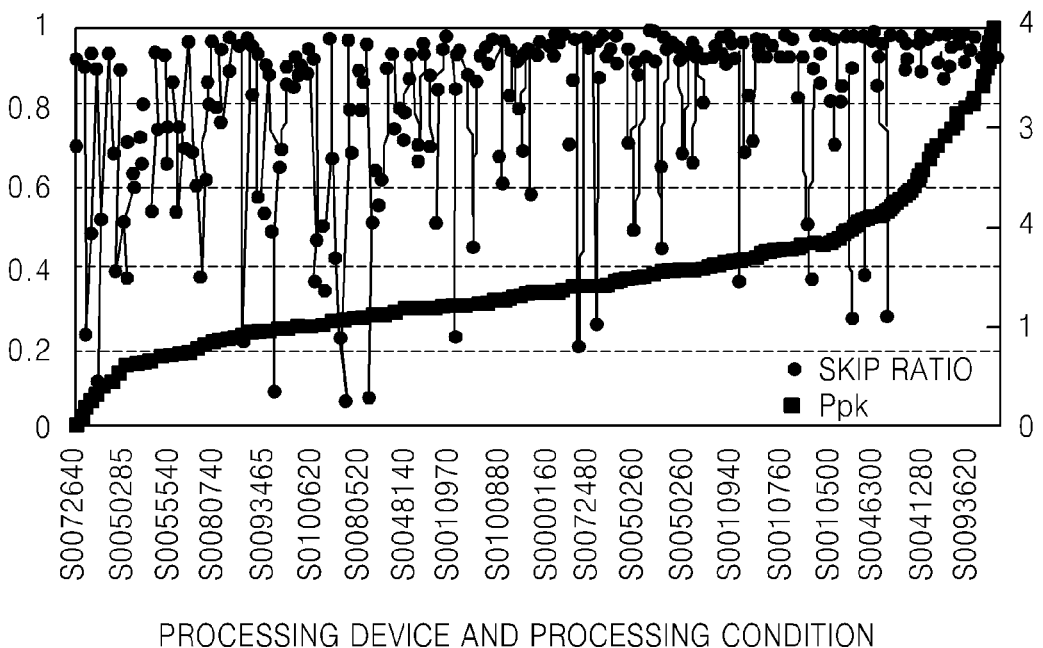
Figure 8:
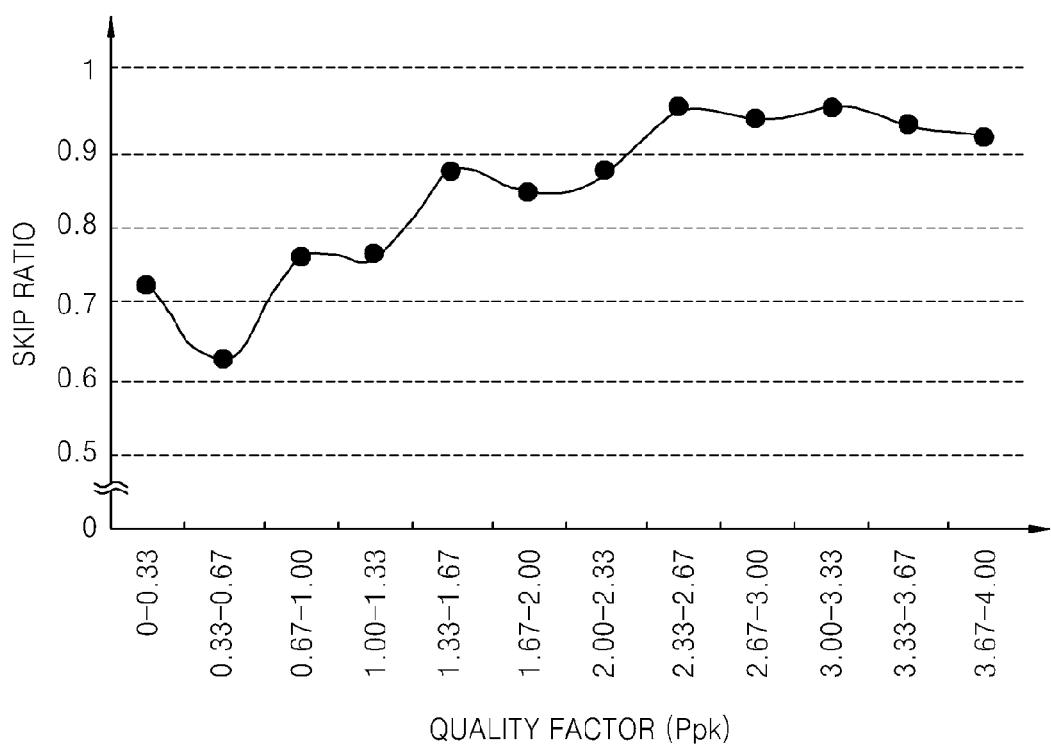

The relationship between the skip ratio (that is, 1-measurement ratio) and the quality level (for example, Ppk) is shown more clearly in FIGS. 7 and 8. FIG. 7 shows a quality factor and a skip ratio according to a processing device and a processing condition, in which the skip ratio increases as the quality factor increases. FIG. 8 shows the skip ratio according to the quality factor of FIG. 7, in which the skip ratio increases as the quality factor increases. As a result, according to the measurement method of the inventive concepts, the skip ratio increases as the quality factor increases according to the processing device and the processing condition.

Figure 9:
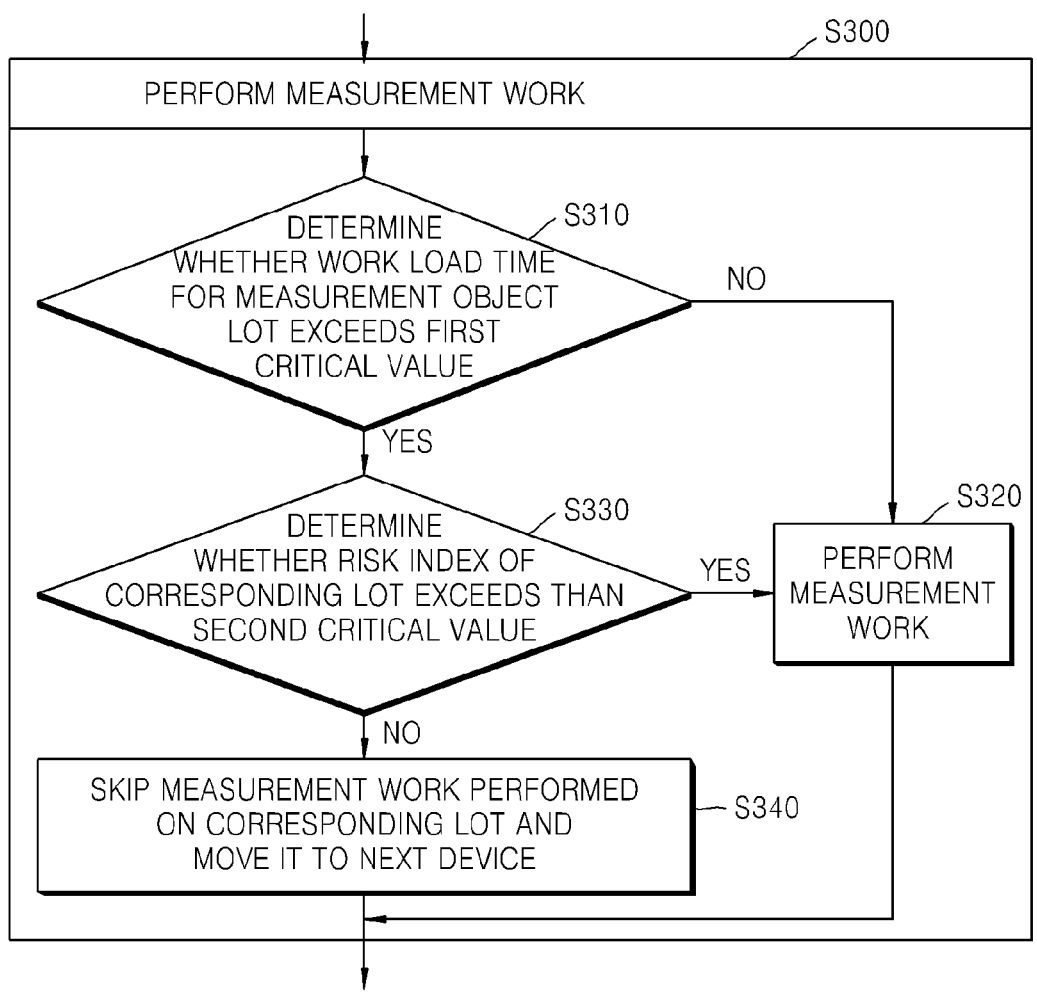
FIG. 9 is a flowchart illustrating a measurement method according to another non-limiting embodiment of the inventive concepts.

FIG. 9 is a flowchart illustrating a measurement method according to another non-limiting embodiment of the inventive concepts. The measurement method specifically shows an algorithm for determining whether, while a measurement work is performed in the aforesaid measurement method, the measurement work performed on measurement object lots is skipped. That is, the measurement method of the present embodiment specifically shows the operation S300 of performing the measurement work of FIG. 2. A repeated explanation of previously-discussed aspects of the embodiments will be omitted for purposes of brevity.

Referring to FIGS. 3 and 9, the operation S300 of performing the measurement work includes operation S310. In operation S310, it is determined whether a work load time for the foremost measurement object lot 106a exceeds a first critical value. Here, the work load time refers to a time required to measure all waiting lots waiting in line at the measurement device 130.

In the same manner as that used to calculate a measurement capability according to a measurement device group, the work load time may also be calculated according to a measurement device group. Accordingly, when a plurality of the measurement devices 130 exist, the work load time may be calculated by summing work times of the plurality of measurement devices 130.

For example, the work load time of the measurement device group (for example, a plurality of thickness measurement devices for measuring thicknesses of deposited metal layers) may be calculated by using the following equation.

$$\text{Work load time} = \frac{\text{Number of waiting lots in measurement devices} \times \text{average measurement time}}{\text{Total measurement capability of measurement device group}} \quad [\text{Equation 6}]$$

For example, when a total measurement capability of a measurement device group is 1000 per hour, the number of waiting lots in the measurement devices 130 is 2000, and an average measurement time is 2 minutes, a work load time is 4 minutes. The work load time of 4 minutes means that a time estimated to be required to measure (for example, measure thicknesses of) all waiting lots is 4 minutes.

If the calculated work load time does not exceed a first critical value (for example, 3 minutes), a measurement work is performed normally and a waiting congestion problem does not occur. Accordingly, in operation S320, a measurement work is performed on the foremost measurement object lot 106a.

If the calculated work load time exceeds the first critical value (for example, 3 minutes), the method proceeds to operation S330. In operation S330, it is determined whether a risk index of the foremost measurement object lot 106a exceeds a second critical value. Here, the risk index is a value indicating a degree to which a quality-related problem may occur when the measurement work performed on the foremost measurement object lot 106a is skipped.

The risk index is dependent on a processing history and an individual processing device, and is affected by the quality characteristics of an individual lot. Accordingly, the risk index is calculated according to an individual lot. For example, a risk index of an individual lot processed by a processing device may be expressed by using the following equation.

$$\text{Risk index of individual lot} = \frac{\text{Number of total lots having been Processed from recently measured lot to currently processed lot} + \text{number of total lots having been processed from recently measured lot to current measurement object lot} + \text{number of accumulated abnormality occurrences}}{\text{measurement cycle of processing devices}} \quad [\text{Equation 7}]$$

As shown in Equation 7, i) the risk index increases as the number of total lots having been processed in the processing devices 100 after a recent measurement increases, ii) the risk index increases as the number of lots having been processed to a current measurement object lot 106 after a recent measurement increases, and iii) the risk index increases as the number of accumulated inappropriate determination occurrences generated during a measurement increases.

Meanwhile, the risk index is inversely proportional to a measurement cycle of a processing device. As the measurement cycle increases, quality increases, and thus the quality of a corresponding lot increases. Accordingly, the risk index decreases. On the contrary, as the measurement cycle decreases, quality decreases, and thus since the quality of a corresponding lot decreases, the risk index increases.

Such a measurement cycle may be calculated empirically or according to the intention of an engineer in charge, or may be derived from the aforesaid measurement ratio. In detail, the measurement cycle may be calculated as a reciprocal of a measurement ratio calculated according to the non-limiting embodiments of the inventive concepts.

If the risk index of an individual lot calculated from Equation 7 exceeds the second critical value, a probability that a quality-related problem may occur when the measurement work performed on the foremost measurement object lot 106a is skipped is high. Accordingly, in this case, the measurement work performed on the foremost measurement object lot 106a is continued.

If the calculated risk index of the individual lot does not exceed the second critical value, a quality-based problem may not occur even though the measurement work performed on the foremost measurement object lot 106a is skipped. Accordingly, in this case, the measurement work performed on the foremost measurement object lot 106a is skipped and the foremost measurement object lot 106a may be moved to a next processing device.

As such, the measurement method and the measurement system using the measurement method according to the non-limiting embodiments of the inventive concepts calculate, if many lots are waiting in the waiting line 135 of the measurement device 130, a quantified risk index and determine whether the foremost measurement object lot 106a is moved accordingly. In the case of the foremost measurement object lot 106a moved after the risk index is calculated, even though a measurement work is skipped, a probability that a quality-related problem may occur is very low. Accordingly, a waiting congestion problem of the measurement device 130 may be solved and a quality-related problem caused by the skipping of the measurement may be prevented.

Figure 10:
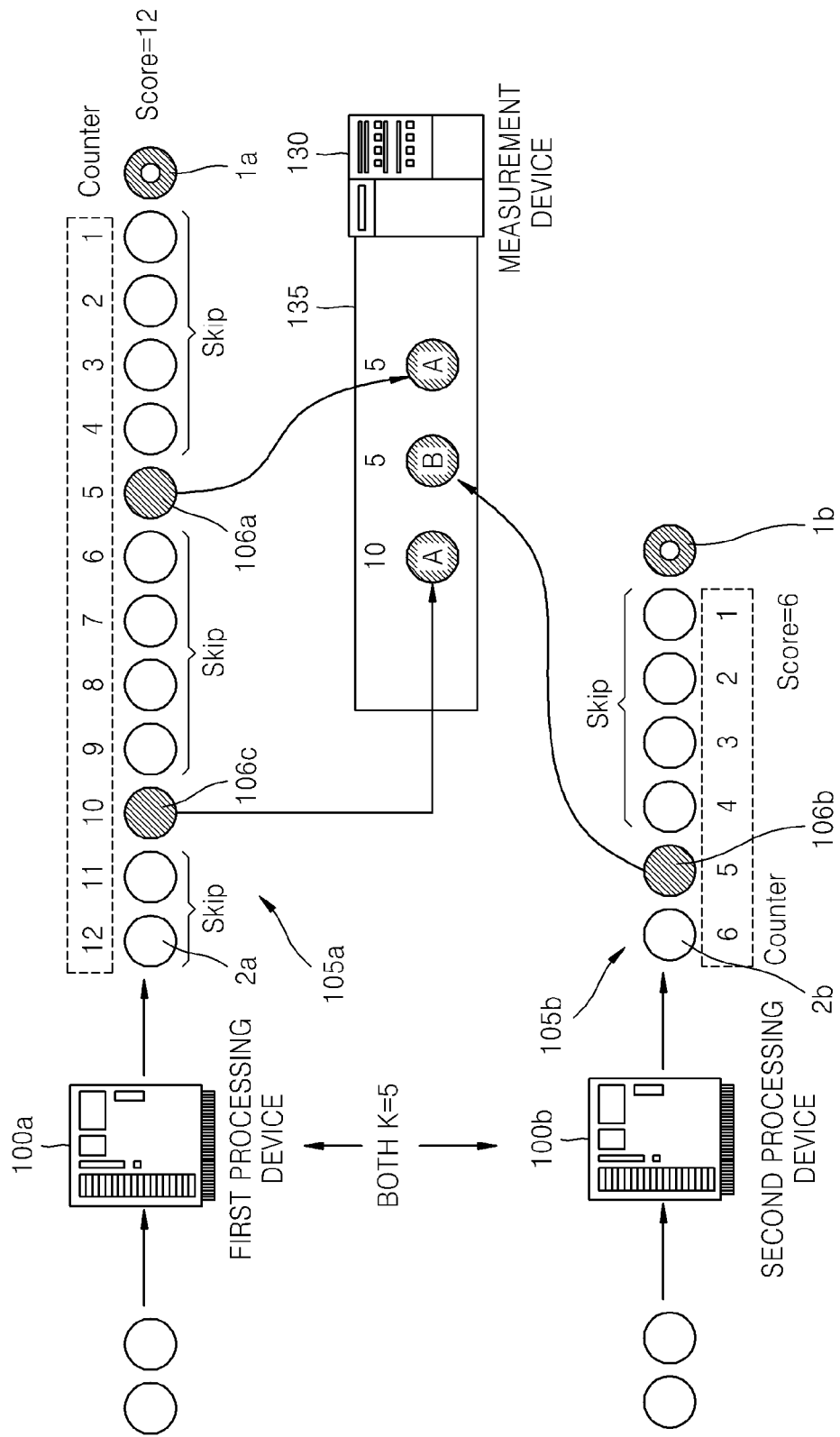
FIG. 10 is a detailed view illustrating a process of calculating a risk index described with reference to FIG. 9.

FIG. 10 is a detailed view illustrating a process of calculating the risk index described with reference to FIG. 9. A repeated explanation of previously-discussed aspects will be omitted for purposes of brevity.

For convenience, Equation 7 is expressed with symbols, as shown in Equation 8.

$$\text{Lot Risk} = \frac{\text{Score} + \text{Counter} + \text{Cum\_interlock}}{K} \quad [\text{Equation 8}]$$

Referring to Equation 8 and FIG. 10, Lot Risk denotes a risk index of an individual lot, Score is defined as the number of total lots having been processed from recently measured lots 1a and 1b to currently processed lots 2a and 2b, and Counter is defined as the number of total lots having been processed from the recently measured lots 1a and 1b to current measurement object lots 106a, 106b, and 106c. Cum_interlock is the number of accumulated inappropriate determination occurrences in the processing devices 100, and K is a measurement cycle of processing devices 100a and 100b.

Processing works are performed under the same processing conditions 110 in the first processing device 100a and the second processing device 100b and a plurality of first lots 105a and a plurality of second lots 105b are tracked out. In this case, for example, measurement ratios β of the first and second processing devices 100a and 100b may be both 0.2. Since a measurement cycle may be calculated as a reciprocal of a measurement ratio as described above, the measurement cycle K is 5. Accordingly, one lot from among five lots is designated as the measurement object lot 106.

While the measurement device 130 performs a measurement work, the first processing device 100a may process 12 lots, and the second processing device 100b may process 6 lots. Since, in both the first processing device 100a and the second processing device 100b, one lot from among 5 lots is designated as the measurement object lot 106, the fifth lot 106a processed by the first processing device 100a, the fifth lot 106b processed by the second processing device 100b, and the tenth lot 106c processed by the first processing device 100a are sequentially located in the waiting line 135. In this case, a risk index of an individual lot may be calculated as follows.

First, in the case of a risk index of the fifth lot 106a of the first processing device 100a, since the number of first lots 105a processed by the first processing device 100a is 12, the number Score of total lots having been processed from a recently measured lot 1a to a currently processed lot 2a is 12. Also, since the fifth lot 106a is a fifth lot from the recently measured lot 1a, the number Counter of total lots having been processed from the recently measured lot 1a to the current measurement object lot 106a is 5. When it is assumed that no error has occurred in the first processing device 100a up to now, Cum_interlock=0. Accordingly, a risk index of the firth lot 106a is (12+5+0)/5=3.4.

In the case of a risk index of the fifth lot 106b of the second processing device 100b, since the number of second lots 105b processed by the second processing device 100b is 6 at present, the number Score of total lots having been processed from the recently measured lot 1b to the currently processed lot 2b is 6. Also, since the fifth lot 106b is a fifth lot from the recently measured lot 1b, the number Counter of total lots having been processed from the recently measured lot 1b to the current measurement object lot 106b is 5. When it is assumed that no error has occurred in the second processing device 100b up to now, Cum_interlock=0. Accordingly, a risk index of the fifth lot 106b is (6+5+0)/5=2.2.

In the case of a risk index of the tenth lot 106c of the first processing device 100a, since the number of first lots 105a processed by the first processing device 100a is 12 at present, the number Score of total lots having been processed from the recently measured lot 1a to the currently processed lot 2a is 12. Also, since the tenth lot 106c is a tenth lot from the recently measured lot 1a, the number Counter of total lots having been processed from the recently measured lot 1a to the current measurement object lot 106c is 10. When it is assumed that no error has occurred in the first processing device 100a up to now, Cum_interlock is 0. Accordingly, a risk index of the tenth lot 106c is (12+10+0)/5=4.4.

For example, if a second critical value is 3, since risk indexes of the fifth lot 106a and the tenth lot 106c of the first processing device 100a are respectively 3.4 and 4.4, the risk indexes 3.4 and 4.4 exceed the second critical value. Accordingly, a measurement work should be performed on both of the fifth lot 106a and the tenth lot 106c of the first processing device 100a. Meanwhile, since the risk index of the fifth lot 106b of the second processing device 100b is 2.2, which is lower than the second critical value, a measurement work performed on the fifth lot 106b of the second processing device 100b may be skipped.

Figure 11A:
FIGS. 11A through 11C are detailed views illustrating a process of calculating the risk index described with reference to FIG. 9.
Figure 11B:
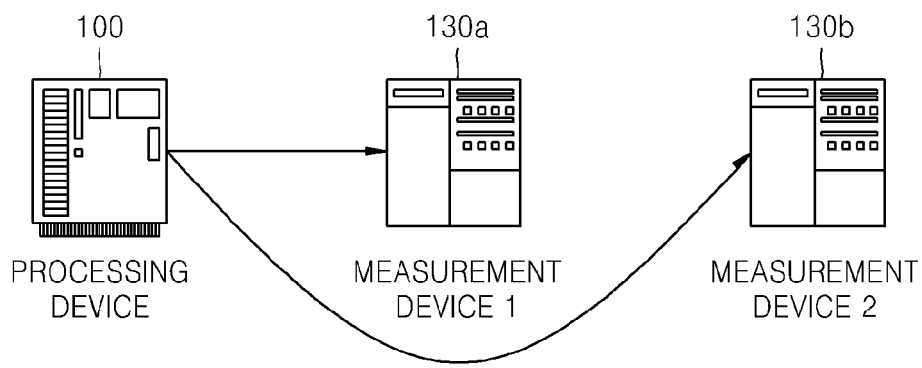
Figure 11C:
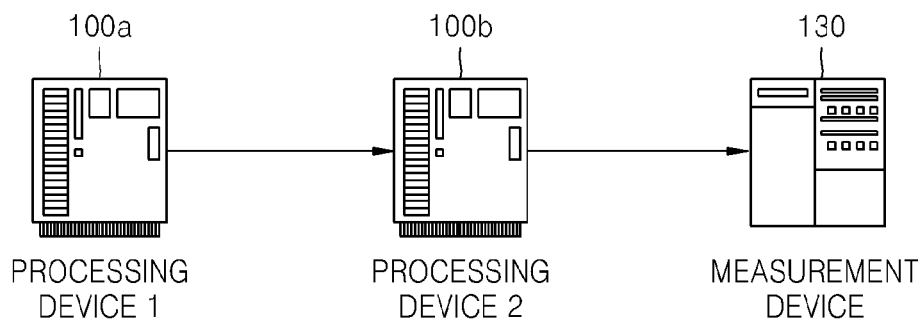

FIGS. 11A through 11C are detailed views illustrating a process of calculating the risk index described with reference to FIG. 9. A repeated explanation of previously-discussed aspects will be omitted for purposes of brevity.

In FIGS. 9 and 10, the processing devices 100 and the measurement devices 130 correspond in a one-to-one manner as shown in FIG. 11A. However, the inventive concepts are not limited thereto. That is, as shown in FIG. 11B, the inventive concepts may apply to a case where one processing device group and a plurality of measurement devices 130a and 130b correspond in a 1:N manner. Also, as shown in FIG. 11C, the inventive concepts may apply to a case where a plurality of processing devices 100a and 100b and one measurement device 130 correspond in an N:1 manner. Further, although not shown, it would be understood by one of ordinary skill in the art that a plurality of processing devices 100 and a plurality of measurement devices 130 may correspond in an N:M manner.

In FIG. 11A, one processing device 100 and one measurement device 130 correspond to each other in a 1:1 manner. In this case, a risk index of an individual lot may be calculated by using the aforesaid algorithm.

As described above, it would be understood by one of ordinary skill in the art that the processing device 100 or the measurement device 130 does not denote only one processing device or only one measurement device. That is, the processing device 100 may be a plurality of processing devices for performing the same processing work. Likewise, the measurement device 130 may be a plurality of measurement devices for performing the same measurement work.

In FIG. 11B, one processing device 100 and a plurality of measurement devices 130a and 130b correspond to each other in a 1:2 manner. In this case, since lots processed by one processing device 100 are respectively located in waiting lines (not shown) of the first and second measurement devices 130a and 130b, a risk index of an individual lot may be calculated twice. For example, if wafer lots are processed by using the processing device 100 for forming a photoresist pattern on a wafer, overlay alignment errors and critical dimensions of the lots are measured.

In this case, a risk index may be separately calculated for lots waiting in line at the first measurement device 130a for measuring an overlay alignment error and lots waiting in line at the second measurement device 130b for measuring a critical dimension.

In FIG. 11C, a plurality of processing devices 100a and 100b and one measurement device 130 correspond to each other in a 2:1 manner. In this case, since lots sequentially processed by the first processing device 100a and the second processing device 100b are located in a waiting line (not shown) of the single measurement device 130, a risk index of an individual lot is calculated only once.

For example, if wafer lots are processed by a first deposition device for depositing a first conductive layer on a wafer and a second deposition device for depositing a second conductive layer on the first conductive layer, thicknesses of the lots may be measured by the single measurement device 130. In this case, a first risk index of the first deposition device and a second risk index of the second deposition device may be calculated by the single measurement device 130.

In order to determine whether a measurement work performed on an individual lot is skipped based on the first risk index and the second risk index, an average value, a maximum value, or a weighted average value of the first and second risk indexes may be used. That is, Equation 8 may be modified as follows.

$$\text{Lot Risk} = \underset{i=1 \text{ to } N}{\text{Max(or Sum)}} \left[ W(i) \times \frac{\text{Score}(i) + \text{Counter}(i) + \text{Cum\_interlock}(i)}{K(i)} \right] \quad [\text{Equation 9}]$$

Here, Lot Risk denotes a risk index of an individual lot, and N is the number of total processing devices 100a and 100b which affect the risk index. W(i) denotes a weight of an ith processing device 100a or 100b, that is, a relative importance of a process performed in the ith processing device 100a or 100b. Score(i) is defined as the number of total lots having been processed from a recently measured lot to a currently processed lot in the ith processing device 100a or 100b, and Counter(i) is defined as the number of total lots having been processed from the recently measured lot to a current measurement object lot in the ith processing device 100a or 100b. Cum_interlock(i) is the number of accumulated inappropriate determination occurrences in the ith processing device 100a or 100b, and K(i) is a measurement cycle of the ith processing device 100a or 100b.

FIG. 12 is a flowchart illustrating a measurement method according to another non-limiting embodiment of the inventive concepts. The measurement method specifically shows whether a measurement work performed on a lot having identical, equivalent, and/or associated quality characteristics to the measurement object lot 106a from among waiting lots waiting in line at a measurement device using the measurement method of FIG. 3 is skipped. That is, the measurement method of the present embodiment specifically shows the operation S400 of performing the correction work of FIG. 2. A repeated explanation of previously-discussed aspects of the embodiments will be omitted for purposes of brevity.

Referring to FIGS. 3 and 12, the operation S400 of performing the correction work includes operation S410. In operation S410, reference information (for example, the aforesaid Score(i), Counter(i), and Cum_interlock(i)) for calculating a risk index is updated.

Next, in operation S420, it is determined whether a work load time required to measure all of the waiting lots 108 waiting in the waiting line 135 at the measurement device 130 exceeds a first critical value. If the work load time does not exceed the first critical value, the operation S400 of performing the correction work is finished.

Otherwise, if the work load time exceeds the first critical value, the method proceeds to operation S430. In operation S430, it is determined whether a similar lot (not shown) having identical, equivalent, and/or associated quality characteristics to the measurement object lot 106a from among the waiting lots 108 waiting in the waiting line 135 at the measurement device 130 exists. Here, the similar lot may be, for example, a lot processed under the same processing device and the same processing condition as that of the measurement object lot 106a. If the similar lot does not exist, the operation S400 of performing the correction work is finished.

Otherwise, if the similar lot exists, the method proceeds to operation S440. In operation S440, it is determined whether a risk index of the similar lot exceeds a second critical value. If the risk index of the similar lot exceeds the second critical value, a quality-related problem may occur when a measurement work performed on the similar lot is skipped. Accordingly, an additional work (that is, movement of the similar lot to the next processing device 150 after the measurement work is skipped) is not performed on the similar lot, and the operation S400 of performing the correction work is finished.

Otherwise, if the risk index of the similar lot does not exceed the second critical value, a quality-related problem may not occur even though a measurement work performed on the similar lot is skipped. Accordingly, in operation S450, a measurement work performed on the waiting lots waiting in the waiting line 135 of the measurement device 130 is skipped and the similar lot is moved to the next processing device 150.

As such, the measurement method according to the inventive concepts may skip a measurement work performed on the measurement object lot 106a before the measurement work is performed, and also may skip a measurement work performed on some of the waiting lots 108 waiting in the waiting line 135 after the measurement work is performed on the measurement object lot 106a. Accordingly, a waiting congestion problem of the measurement device 130 may be solved.

Figure 13:
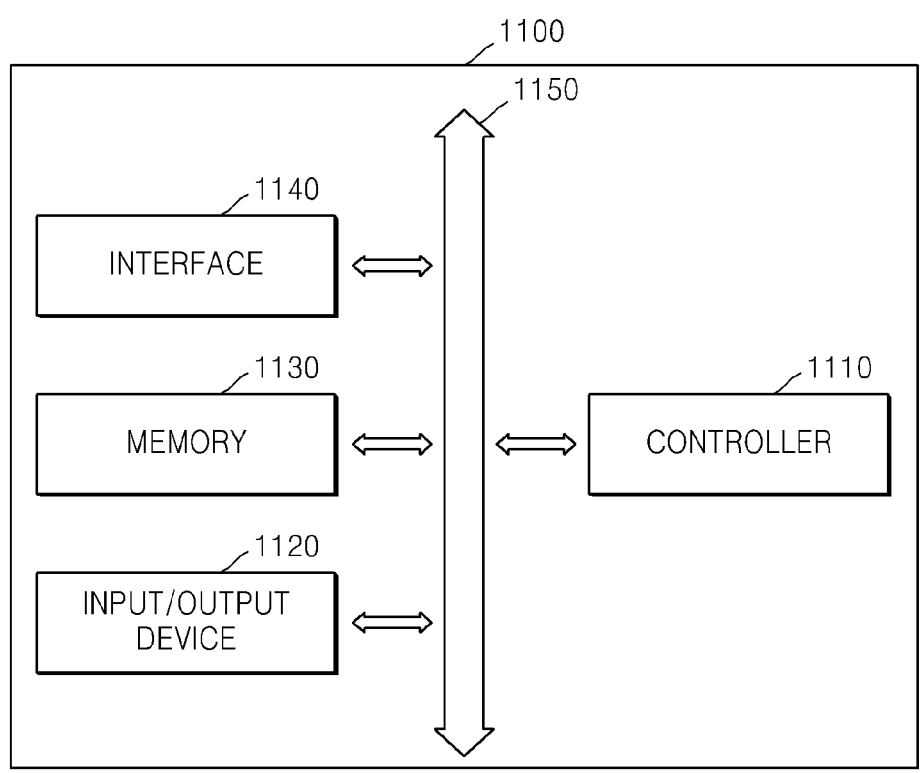
FIG. 13 is a block diagram illustrating a measurement system for performing a measurement work by using a measurement method according to a non-limiting embodiment of the inventive concepts.

FIG. 13 is a block diagram illustrating a measurement system 1100 for performing a measurement work by using a measurement method, according to a non-limiting embodiment of the inventive concepts.

Referring to FIG. 13, the measurement system 1100 may include a controller 1110 (or processor), an input/output device 1120, a memory 1130, and an interface 1140. The controller 1110 executes a program, and controls the measurement system 1100. The input/output device 1120 may be used to input or output data of the measurement system 1100. The measurement system 1100 may be connected to an external device, for example, a personal computer or a network, via the input/output device 1130 to exchange data with the external device. The input/output device 1120 may be, for example, a keypad, a keyboard, or a display. The memory 1130 may store code and/or data for operating the controller 1110, and/or store data processed by the controller 1110. The interface 1140 may be a data transmission path between the measurement system 1100 and the external device. The controller 1110, the input/output device 1120, the memory 1130, and the interface 1140 may communicate with one another through a bus 1150.

The aforesaid measurement methods may be embodied as computer-readable code, which may be read by a computer, on a computer-readable recording medium. In detail, a measurement program for performing the measurement method may be stored in a recording medium installed in the measurement system 1100. The measurement system 1100 may perform a measurement work according to the measurement method of the measurement program stored in the recording medium.

The computer-readable recording medium may be any recording apparatus capable of storing data that is read by a computer system. Examples of the computer-readable recording medium include read-only memories (ROMs), random-access memories (RAMs), CD-ROMs, magnetic tapes, floppy disks, and optical data storage devices. The computer-readable recording medium may be a carrier wave that transmits data via the Internet, for example. The computer readable medium may be distributed among computer systems that are interconnected through a network, and the inventive concepts may be stored and implemented as computer readable code in the distributed system. Functional programs, codes, and code segments for embodying the inventive concepts may be derived with relative ease by programmers in the technical field to which the inventive concepts pertain.

It should be understood that elements illustrated in the drawings are merely schematic to enhance the understanding of the inventive concepts and their shapes may not be representative of the actual shapes. Thus, it should be understood that the elements may have other various shapes. The same reference numerals in the drawings denote the same elements.

While the inventive concepts have been particularly shown and described with reference to various example embodiments herein, it will be understood that various changes in form and details may be made without departing from the spirit and scope of the following claims.

What is claimed is:

1. A measurement method of measuring lots processed according to a processing device and a processing condition, the measurement method comprising:
    calculating a measurement capability indicating a degree to which members to be measured may be processed per unit time in a measurement device, the measurement capability being a function of calculation unit time, measurement efficiency, and measurement time;
    allocating the measurement capability according to the processing device and the processing condition;
    calculating, based on the allocated measurement capability, a measurement ratio of the lots processed by the processing device and the processing condition; and
    measuring a quantity of lots with the measurement device based on the measurement ratio,
    wherein the allocating the measurement capability comprises allocating the measurement capability such that the measurement capability is proportional to a processing scheduled quantity of lots to be processed according to the processing device and the processing condition, and
    wherein the processing scheduled quantity of lots to be processed according to the processing device and the processing condition is a value obtained by multiplying a previous processing ratio of lots processed according to the processing device and the processing condition by a processing scheduled quantity of lots according to individual processing conditions, the previous processing ratio being a ratio of a processing quantity of the processing device under the processing condition to processing quantities of a plurality of processing devices under the processing condition.

2. The measurement method of claim 1, wherein the allocating the measurement capability comprises allocating the measurement capability such that the measurement capability is proportional to an error ratio of lots processed according to the processing device and the processing condition.

3. The measurement method of claim 2, wherein the error ratio is a type II error which occurs when lots which should be determined to be inappropriate are mistakenly determined to be appropriate.

4. The measurement method of claim 1, wherein the measurement ratio is a value obtained by dividing the measurement capability allocated according to the processing device and the processing condition by the processing scheduled quantity of lots to be processed according to the processing device and the processing condition.

5. The measurement method of claim 1, wherein the calculating a measurement capability comprises calculating the measurement capability such that the measurement capability is inversely proportional to the measurement time required to measure lots according to requested measurement conditions.

6. The measurement method of claim 5, wherein the measurement time is an average value obtained by averaging measurement times of the measurement conditions.

7. The measurement method of claim 5, wherein the measurement time is a weighted average value obtained by adding a greater weight to a measurement time with a larger measurement history of a measurement condition from among the measurement times and averaging measurement times of the measurement conditions.

8. The measurement method of claim 1, further comprising:
    according to the measurement ratio, defining some lots processed in the processing device as measurement object lots;
    moving the measurement object lots to the measurement device;
    moving some of remaining lots to a next processing device; and
    performing a measurement work on the measurement object lots in the measurement device.

9. A measurement method of measuring lots processed according to a processing device and a processing condition, the measurement method comprising:
    calculating a measurement capability indicating a degree to which members to be measured may be processed per unit time in a measurement device;
    allocating the measurement capability according to the processing device and the processing condition;
    calculating, based on the allocated measurement capability, a measurement ratio of the lots processed by the processing device and the processing condition; and
    measuring a quantity of lots with the measurement device based on the measurement ratio,
    according to the measurement ratio, defining some lots processed in the processing device as measurement object lots;
    moving the measurement object lots to the measurement device;
    moving some of remaining lots to a next processing device; and
    performing a measurement work on the measurement object lots in the measurement device,
    wherein the performing a measurement work comprises, when a work load time required to measure all waiting lots waiting in line at the measurement device exceeds a first critical value and a risk index of a foremost measurement object lot does not exceed a second critical value, skipping the measurement work performed on the foremost measurement object lot and moving the foremost measurement object lot to the next processing device, the risk index being a value indicating a degree to which a problem may occur when the measurement work performed on the measurement object lots is skipped.

10. A measurement method of measuring lots processed according to a processing device and a processing condition, the measurement method comprising:
    calculating a measurement capability indicating a degree to which members to be measured may be processed per unit time in a measurement device;
    allocating the measurement capability according to the processing device and the processing condition;
    calculating, based on the allocated measurement capability, a measurement ratio of the lots processed by the processing device and the processing condition; and
    measuring a quantity of lots with the measurement device based on the measurement ratio,
    according to the measurement ratio, defining some lots processed in the processing device as measurement object lots;
    moving the measurement object lots to the measurement device;

moving some of remaining lots to a next processing device; and performing a measurement work on the measurement object lots in the measurement device, after the performing a measurement work, the measurement method further comprising:

when a work load time required to measure all waiting lots waiting in the measurement device exceeds a first critical value and a risk index of a similar lot having identical, equivalent, or associated quality characteristics to a foremost measurement object lot from among the waiting lots does not exceed a second critical value, skipping a measurement work performed on the similar lot and moving the similar lot to the next processing device, wherein the risk index is a value indicating a degree to which a problem may occur when the measurement work performed on the similar lot is skipped.

11. The measurement method of claim 10, wherein the similar lot is a lot processed in the same processing device and the same processing condition as the processing device and the processing condition in which the foremost measurement object lot is processed.

12. A measurement method of lots processed according to a processing device and a processing condition, the measurement method comprising:

calculating a measurement capability indicating a degree to which members to be processed may be processed per unit time in a measurement device, the measurement capability being a function of calculation unit time, measurement efficiency, and measurement time;

allocating the measurement capability according to the processing device and the processing condition such that the measurement capability is proportional to at least one of a defective ratio of the lots and a previous processing ratio;

calculating, based on the allocated measurement capability, a measurement ratio of the lots, the measurement ratio being proportional to the measurement capability allocated according to the processing device and the processing condition, and the measurement ratio being inversely proportional to a processing scheduled quantity of lots according to the processing device and the processing condition; and measuring a quantity of lots with the measurement device based on the measurement ratio, wherein the allocating the measurement capability comprises allocating the measurement capability such that the measurement capability is proportional to the processing scheduled quantity of lots to be processed according to the processing device and the processing condition, and wherein the processing scheduled quantity of lots to be processed according to the processing device and the processing condition is a value obtained by multiplying a previous processing ratio of lots processed according to the processing device and the processing condition by a processing scheduled quantity of lots according to individual processing conditions, the previous processing ratio being a ratio of a processing quantity of the processing device under the processing condition to processing quantities of a plurality of processing devices under the processing condition.

13. A method of controlling quality of lots processed with a processing device and a corresponding processing condition, the method comprising:

calculating a measurement capability of a measurement device, the measurement capability indicating a quantity of lots that can be measured per unit time by the measurement device, the measurement capability being a function of calculation unit time, measurement efficiency, and measurement time;

allocating the measurement capability according to the processing device and the processing condition such that the measurement capability is proportional to at least one of an error ratio and a processing scheduled quantity of lots to be processed;

calculating, based on the allocated measurement capability, a measurement ratio according to the processing device and the processing condition; and measuring a quantity of lots with the measurement device based on the measurement ratio, wherein the allocating the measurement capability comprises allocating the measurement capability such that the measurement capability is proportional to the processing scheduled quantity of lots to be processed according to the processing device and the processing condition, and wherein the processing scheduled quantity of lots to be processed according to the processing device and the processing condition is a value obtained by multiplying a previous processing ratio of lots processed according to the processing device and the processing condition by a processing scheduled quantity of lots according to individual processing conditions, the previous processing ratio being a ratio of a processing quantity of the processing device under the processing condition to processing quantities of a plurality of processing devices under the processing condition.

14. The method of claim 13, wherein the calculating a measurement ratio includes dividing the measurement capability by the processing scheduled quantity of lots to be processed.

15. The method of claim 13, further comprising:

designating a measurement object lot according to the measurement ratio, the measurement object lot being designated from the lots processed with the processing device and processing condition.

16. The method of claim 15, further comprising:

moving one or more lots not designated as the measurement object lot to a next processing device.

* * * * *